United States Patent Office 3,520,638
Patented July 14, 1970

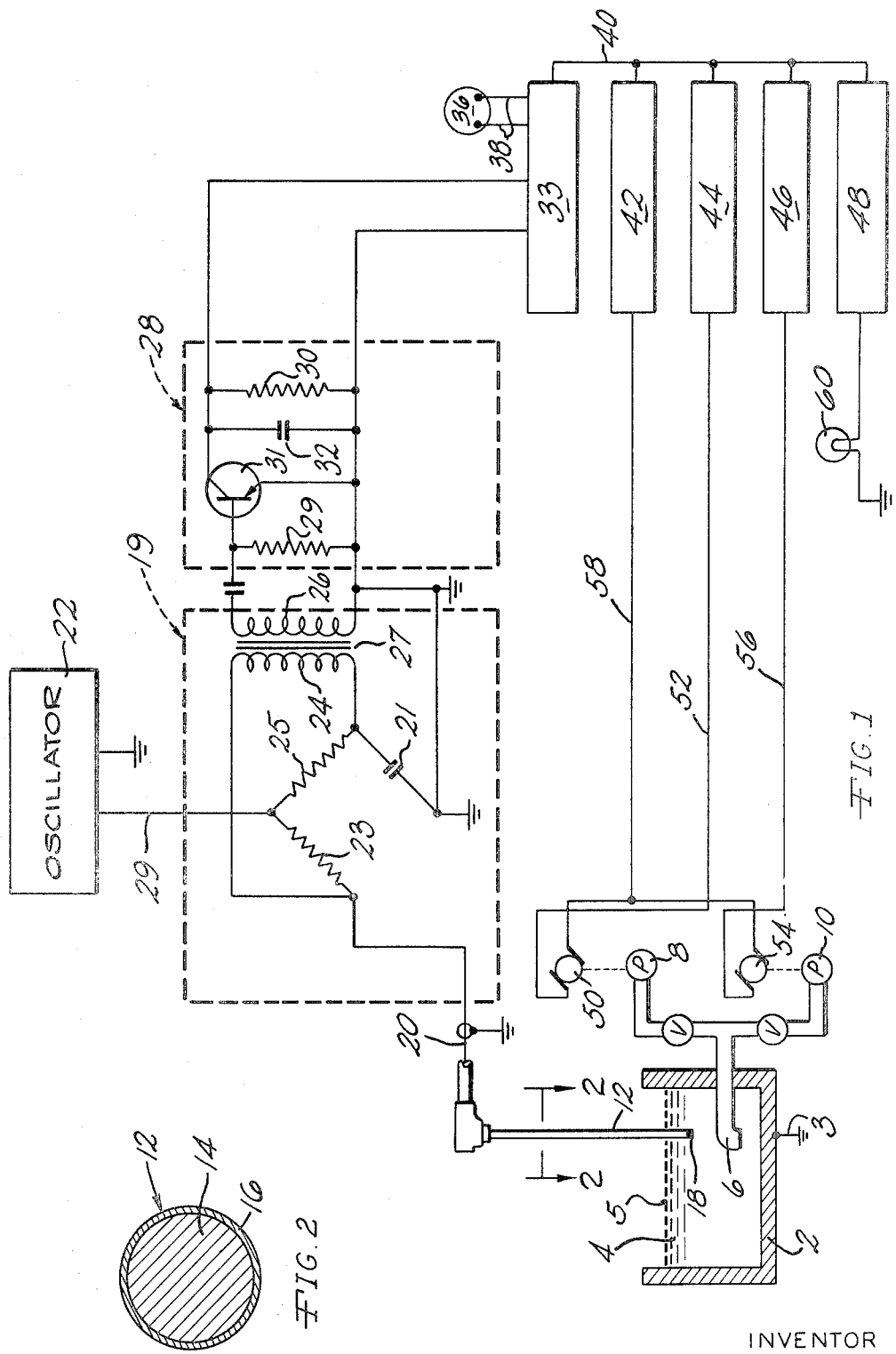

3,520,638
MEANS AND APPARATUS FOR SENSING AND CONTROLLING MATERIAL LEVELS
Donald H. McUmber, Clark Lake, and John W. Blackgrove, Jackson, Mich., assignors to Richard Huttenlocher and Edward L. Cobb, escrow agents
Filed Apr. 8, 1968, Ser. No. 719,529
Int. Cl. F04b 49/02; G01f 23/00
U.S. Cl. 417—36                               2 Claims

ABSTRACT OF THE DISCLOSURE

A method and apparatus for sensing and controlling the level of material such as a liquid or granular substance in which the liquid or substance acts as the dielectric of an electrical condenser, the capacity of which is varied by the level of the liquid or granular substance. The condenser is part of a Wheatstone bridge circuit the unbalance of which is a function of the level of the liquid or granular substance and the output of which is a function of the bridge unbalance whereby the voltage output of the Wheatstone bridge is varied as a function of level for level indication and/or actuating a pump or other level adjusting device.

BACKGROUND OF THE INVENTION

Field of invention

The fluid level of low viscosity liquids is easily sensed, and circuits to control the level are easily actuated by means of floats or other similar devices. This type apparatus is, however, not readily adaptable to the measuring of high viscosity liquids or granular substances; for example, sewage, grain, sawdust, etc.

Some of the factors that affect the measuring of highly viscous liquids or granular substances by the float method or by other methods of the prior art are: (1) the viscous liquid or substance clings to the measuring device affecting its operation; (2) the viscous liquid or substance clogs moving parts and thereby locks the system and prevents its proper operation.

The ideal system for measuring the levels of viscous fluids or granular substances should have the following characteristics: (a) a surface condition that minimizes clinging of the liquid to the measuring device; (b) be unaffected by the viscosity of the liquid or substance; and (c) be unaffected by variations in the viscosity of the liquid or substance.

To meet all of the above characteristics the measuring device must: (a) have no moving parts; (b) have no cavities that can become clogged by the viscous liquid or granular substance and thus affect the operation of the device; (c) have a surface to which the liquid or substance does not readily adhere; and (d) should retain these characteristics over a long period of usage.

Description of the prior art

The prior art includes, in addition to the normal type liquid measuring devices, electronic sensing apparatus such as shown in U.S. Pats. 3,030,890 and 3,311,722. In these disclosures probes are placed in fixed locations to sense and control liquid flow. Other apparatus such as shown in U.S. Pats. 2,213,961, 2,838,929 and 2,863,372 use capacitor sensing devices to determine and/or control the level of a liquid. None of the devices in the prior art use a system wherein the level of the liquid or granular substance is sensed using a variable condenser to produce a varying voltage and this varying voltage used to actuate fully adjustable multiple function alarms or level controlling devices such as in the present invention.

SUMMARY OF THE INVENTION

In the present invention a probe is formed by coating a metallic rod with a layer of Teflon. The probe is inserted into the liquid or substance to be measured or controlled. The metallic rod forming the probe core is one plate of an electrical condenser, the Teflon coating on the probe is part of the dielectric material between the plates, the liquid or substance to be measured is also part of the dielectric of the condenser and the condenser's other plate is the grounding point. This provides a variable condenser the capacitance of which is a function of the level of the liquid or substance.

This variable condenser is used as part of a resistance capacitance Wheatstone bridge circuit energized by an electric signal generator. The output of the bridge circuit is a function of the unbalance of the bridge and thus a function of the capacitance of the condenser which is varied by the liquid or substance level and this output thus indicates the level.

The alternating current output of the bridge is converted into a direct current voltage and thereafter amplified. The magnitude of this voltage (which represents the level of the liquid or substance) is indicated by a meter and the voltage may be used to actuate one or more level controlling means.

The preferred means for controlling the level of a liquid are electrical motor driven pumps energized by relays that are actuated responsive to this amplified D.C. voltage. As the liquid rises around the probe, the capacitance of the condenser including the probe increases and tends to move the unbalanced bridge circuit toward balance and thus reduces the A.C. voltage across the bridge. This A.C. voltage is rectified to produce a D.C. voltage and the latter amplified. The rectifier operates in such a manner that a decreased A.C. input voltage will produce an increased D.C. output voltage. As the liquid rises, the output voltage from the D.C. amplifier increases to such magnitude as to actuate the circuit controlling a motor driven pump. If the first pump is not of sufficient capacity to stop the rise of the liquid, this rising level will move the Wheatstone bridge closer to balance and increase this D.C. voltage until a second pump controlling circuit is actuated. Any number of motor driven pumps may be used, each one controlled to start at a higher voltage than the preceding one.

In one particular embodiment of the invention, an alarm is actuated at the highest level of the liquid which is desired. This alarm alerts the operator to take emergency action.

In the preferred embodiment of the invention, all of the motors remain in operation until the liquid level is down to its minimum level at which point the Wheatstone bridge is at maximum unbalance and the electrical output of the bridge is a maximum, providing minimum D.C. control voltage from the converter.

Further objects, features and advantages of this invention will become apparent from a consideration of the following description, the appended claims, and the accompanying drawing in which:

FIG. 1 is a schematic drawing showing the invention; and

FIG. 2 is an enlarged cross-sectional view of the sensing probe in the apparatus of this invention, as seen from substantially the line 2—2 in FIG. 1.

Referring to the drawing, 2 is a tank or well containing a material 4 which can be a liquid or granular substance, the level 5 of which may be caused to vary by external forces. In the illustrated embodiment of the invention, the liquid or substance 4 is sewage, and the sewage level 5 is controlled in a wet well 2 of a sewage lift system. In this embodiment, 6 is a conduit through which the sewage is pumped out of the wet well 2 by pumps 8 and 10. Inserted in the liquid 4 is a probe 12 having a metallic core 14. This core may be of any electrical current conducting material but is preferably a metal such as aluminum, steel, brass, copper, etc. It is coated by a dielectric material impervious to the liquid 4 and is here shown as a plastic jacket 16 preferably formed of Teflon.

The jacket 16 protects the core 14 from the acid or other corroding chemicals in the liquid 4 and is also part of the dielectric of a condenser. The probe 12 is closed at its bottom end by a seal 18 made from electrical insulating material. A condenser is thereby formed in which one plate is the grounding point 3, which is shown attached to wet well 2 for simplicity, and the core 14 is the other plate. In this condenser, the sewage 4 and the jacket 16 constitute the dielectric. The capacitance of this condenser varies as the level 5 of the liquid 4 varies changing the size of the dielectric.

The condenser formed by grounding point 3, liquid 4, dielectric coating 16, and core 14 is connected to a resistance capacitance Wheatstone bridge circuit indicated generally at 19, by means of coaxial cable 20. This Wheatstone bridge circuit 19 includes a condenser 21 which is such as to unbalance the circuit for maximum output when the sewage level 5 is at the minimum desired level. The bridge circuit 19 also includes resistances 23 and 25. The bridge is energized by an oscillator 22 through a conductor 29 connected to circuit 19 between resistances 23 and 25, and has an output transformer 27 having a primary coil 24 and a secondary coil 26. The coil 24 is connected at one point between probe 12 and resistance 23 and at another point between condenser 21 and resistance 25. The output of the secondary coil 26 of this transformer is connected to a D.C. converter 28 of conventional construction which includes resistors 29 and 30, a transistor 31 and a condenser 32 arranged as shown. The D.C. output of the converter 28 is connected to an amplifier 33. The D.C. signal from the amplifier 33 is conducted to a fluid level indicating meter 36 through conductors 38. An output voltage is fed from amplifier 33 through the line 40 to peak detector circuits 42 and 44, 46 and 48, commonly known as Schmitt trigger circuits. The circuit 42, in the preferred embodiment of the invention, functions as an "all pumps off" circuit and maintains all the pumps in operation and turns them off simultaneously when the voltage output of the Wheatstone bridge circuit 19 is at a maximum indicating the liquid is at its minimum desired level. The circuit 44 controls the pump 8 by means of pump motor 50 responsive to a voltage from amplifier 33 through line 52. The circuit 46 controls the pump 10 through pump motor 54 by a voltage fed through line 56 from amplifier 33. Both pumps 8 and 10 are shut off simultaneously by a signal fed from "all pumps off" circuit 42 through line 58 to the motors 50 and 54. The circuit 48 controls an alarm 60.

OPERATION OF THE PREFERRED EMBODIMENT

As the liquid rises on the probe 12 it causes the capacitance of the condenser including the probe to increase by increasing the amount of dielectric material between core 14 and grounding point 3. This change in capacitance causes the Wheatstone bridge to become less unbalanced which results in a decrease in the base-emitter voltage of transistor 31 which produces an increase in the output voltage of the D.C. converter 28. The voltage output of converter 28 is amplified in amplifier 33. This amplified voltage is fed to the meter 36 and to peak detector circuits 42, 44, 46 and 48 which can be set by a potentiometer to trigger at any predetermined voltage. As the desired liquid level requiring operation of the first pump 8 is reached, the peak detector circuit 44 will cause energization of the first motor 50. This motor control circuit 44 is then locked in the energized position through the "all pumps off" circuit 42. If the pump 8 causes the level in the liquid to fall, the circuit 42 will hold the pump 8 running until the voltage is such as to indicate the liquid level is at the desired minimum. If instead of falling, the level 5 of the liquid 4 continues to rise, the voltage output of the Wheatstone bridge 19 continues to decrease thus increasing the output of the amplifier 33 to thereby turn on the second pump 10 through peak detector circuit 44 which is set to energize motor 54 at the increased voltage signal now received from amplifier 33. If both the pumps are unable to reduce the level 5 of the liquid 4 and it continues to rise to its high level point then the circuit 48 is energized causing the alarm 60 to sound.

In the normal operation of the circuit the first pump 8 will be operated and if the liquid continues to rise then the second pump 10 will be operated and the two pumps together will operate to reduce the level of the liquid. Both pumps will remain in operation until the desired minimum level of the liquid is reached at which time the circuit 42 will operate to de-energize the pump motors 50 and 54 simultaneously.

It will thus be seen that by means of the present invention a variable capacitance probe which is part of a Wheatstone bridge circuit is inserted in a liquid or granular substance and the output from the bridge circuit will be proportional to the level of the liquid or substance. This output signal produced as a result of bridge unbalance is thereafter used for level indication and for controlling the pumps and alarm system.

It will thus be understood that the method and apparatus for sensing and controlling material levels as herein disclosed and described are presented for purposes of explanation and illustration only and are not intended to indicate limits of the invention, the scope of which is defined by the following claims.

We claim:

1. In a device for sensing the level of a liquid, the combination comprising: a probe, the electrical capacitance of which varies as a function of the liquid level, a Wheatstone bridge circuit including two impedance elements each having resistance components and two impedance elements each having capacitance components, one of said capacitance components being said probe, a fixed frequency source of alternating current connected to said bridge circuit, an output circuit for said bridge circuit having a pair of terminals, one of said terminals of said output circuit being connected between said probe and one of said impedance elements having a resistance component, the other one of said terminals being connected between the other of said impedance elements having a resistance component and the other of said impedance elements having a capacitance component, the capacitance of said probe being of such value as to vary an unbalance of said bridge circuit as said liquid level rises above a predetermined level thereby causing the output signal from said bridge circuit to vary in magnitude with the magnitude of said liquid level rise, a plurality of electrical motor driven pumps for lowering said liquid level, and circuit means responsive in operation to said output signal only when said signal is of predetermined magnitude and operable to cause operation of at least one of said pumps for lowering said liquid level, whereby the level of liquid is controlled.

2. In a liquid level sensing device as claimed in claim 1 further including energizing means for said electrical motor driven pumps, each of said energizing means being preset to actuate the motor therefor at a different capacitance value of said probe.

References Cited

UNITED STATES PATENTS 2,623,928  12/1952  Bower _____ 324—61
2,672,880   3/1954  Hermanson _____ 103—11 X (Other references on following page)

| | | | |
|---|---|---|---|
| 2,919,579 | 1/1960 | Gronner | 73—304 |
| 3,010,319 | 11/1961 | Sontheimer | 73—304 |
| 3,136,871 | 6/1964 | Bartetta | 103—11 |
| 3,213,360 | 10/1965 | Cook et al. | 324—61 |
| 3,277,711 | 10/1966 | Roberge | 73—304 |
| 3,285,181 | 11/1966 | Howard | 103—11 |
| 3,392,581 | 7/1968 | Miller | 73—304 |
| 3,131,314 | 4/1964 | Charlot | 307—290 |

OTHER REFERENCES

Waveforms by Britton Chance et al., published by McGraw-Hill Company Inc. (1949) pp. 501–505.

WILLIAM L. FREEH, Primary Examiner

U.S. Cl. X.R.

103—25; 137—392; 117—314; 417—45